(12) United States Patent
Papenbroock et al.

(10) Patent No.: US 11,312,889 B2
(45) Date of Patent: Apr. 26, 2022

(54) MOISTURE-CROSSLINKABLE, DIMENSIONALLY STABLE POLYMER MATERIAL

(71) Applicant: tesa SE, Norderstedt (DE)

(72) Inventors: Marten Papenbroock, Hamburg (DE); Sven Heidsieck, Hamburg (DE); Björn Zeysing, Hamburg (DE); Tobias Winkler, Hamburg (DE); Norbert Grittner, Hamburg (DE); Friederike Kettling, Hamburg (DE)

(73) Assignee: tesa SE, Norderstedt (DE)

(*) Notice: Subject to any disclaimer, the term of this patent is extended or adjusted under 35 U.S.C. 154(b) by 0 days.

(21) Appl. No.: 16/922,476

(22) Filed: Jul. 7, 2020

(65) Prior Publication Data
US 2021/0009878 A1 Jan. 14, 2021

(30) Foreign Application Priority Data

Jul. 8, 2019 (DE) .................. 10 2019 209 987.4
Dec. 19, 2019 (DE) .................. 10 2019 220 101.6

(51) Int. Cl.
| | | |
|---|---|---|
| C09J 183/04 | (2006.01) |
| C08J 3/24 | (2006.01) |
| C09J 183/06 | (2006.01) |
| C08G 77/08 | (2006.01) |
| C08G 77/18 | (2006.01) |
| C08G 77/22 | (2006.01) |
| C08G 77/16 | (2006.01) |

(52) U.S. Cl.
CPC ............ *C09J 183/04* (2013.01); *C08G 77/08* (2013.01); *C08G 77/16* (2013.01); *C08G 77/18* (2013.01); *C08G 77/22* (2013.01); *C08J 3/244* (2013.01); *C09J 183/06* (2013.01); *C09J 2301/306* (2020.08)

(58) Field of Classification Search
CPC ................................................. C09J 183/04
See application file for complete search history.

(56) References Cited

U.S. PATENT DOCUMENTS

| 6,204,350 | B1 * | 3/2001 | Liu ............... C08L 101/10 427/195 |
| 2007/0219285 | A1 * | 9/2007 | Kropp ............... C09J 4/06 522/7 |
| 2011/0034627 | A1 | 2/2011 | Boudet |
| 2012/0277373 | A1 | 11/2012 | Zander |
| 2015/0267094 | A1 | 9/2015 | Friedel |
| 2017/0306201 | A1 * | 10/2017 | Amako ............... C08G 77/44 |
| 2020/0117971 | A1 * | 4/2020 | Komori ............... B25B 13/08 |
| 2020/0123417 | A1 * | 4/2020 | Kodama ............... C09J 11/04 |
| 2021/0163802 | A1 * | 6/2021 | Schwartz ............... C08G 77/14 |

FOREIGN PATENT DOCUMENTS

| EP | 771 855 A2 * | 6/1997 |
| EP | 1396513 A1 | 3/2004 |
| WO | 2007009871 A2 | 1/2007 |
| WO | 2009130298 A1 | 10/2009 |
| WO | 2011051385 A2 | 5/2011 |
| WO | 2012119940 A1 | 9/2012 |
| WO | 2014013038 A1 | 1/2014 |
| WO | 2014086638 A1 | 6/2014 |
| WO | 2015013407 A1 | 1/2015 |
| WO | 2016110532 A1 | 7/2016 |
| WO | 2017191322 A1 | 11/2017 |
| WO | 2018109425 A1 | 6/2018 |
| WO | WO 2018/230290 A1 * | 12/2018 |
| WO | 2019134863 A1 | 7/2019 |

OTHER PUBLICATIONS

European Patent Office, European Search Report, European Patent No. 20180548, filed Nov. 20, 2020, 7 pages.
German Examination Report for German Application No. 10 2019 220 101.6, dated Jul. 24, 2020 (2 pages).

* cited by examiner

*Primary Examiner* — Marc S Zimmer
(74) *Attorney, Agent, or Firm* — Price Heneveld LLP

(57) ABSTRACT

An autohesive polymer material that includes: at least one polymer having at least two terminal silyl groups of the Formula (1) given by:

$$Si(R^1)_a(R^2)_b \qquad (1).$$

Each of the radicals $R^1$ comprises an alkyl, alkenyl or aryl group or a hydrogen atom. Each of the radicals $R^2$ comprises a group that can be eliminated with water, b is 1, 2 or 3, and a is 3−b. The polymer material further includes at least one condensation catalyst. Further, the polymer material is chemically precrosslinked and further crosslinkable with moisture. In addition, the polymer material is configured for use as a layer body that can be applied to a substrate. The polymer material of this kind can also be used for producing permanent bonds.

20 Claims, No Drawings

MOISTURE-CROSSLINKABLE, DIMENSIONALLY STABLE POLYMER MATERIAL

CROSS-REFERENCE TO RELATED APPLICATIONS

This application claims the benefit of priority under 35 U.S.C. § 119 of German Patent Application No. 10 2019 220 101.6, filed Dec. 19, 2019, entitled MOISTURE-CROSS-LINKABLE, DIMENSIONALLY STABLE POLYMER MATERIAL, and German Patent Application No. 10 2019 209 987.4, filed Jul. 8, 2019, entitled MOISTURE-CROSS-LINKABLE, DIMENSIONALLY STABLE POLYMER MATERIAL, the contents of which are relied upon and incorporated herein by reference in their entirety.

FIELD OF THE DISCLOSURE

The disclosure is situated generally within the technical field of polymer materials as employed in home and industry for multivarious applications. The disclosure relates more specifically to an autohesive polymer material which is precrosslinked and is further crosslinkable with moisture. This material in particular has sufficient dimensional stability to be able to be applied as a layer body to a substrate and to be used, for example, in construction applications.

BACKGROUND

Polymer systems which possess reactive silyl groups are known—as a basis for sealant and adhesive formulations, for example. They are distinguished by their high adhesion to numerous surfaces. In particular they are capable of developing a very stable and durable attachment to substrate surfaces.

The polymers are capable of entering into condensation reactions with one another, either under the influence of moisture from the environment or mediated through added crosslinkers, at temperatures as low as room temperature. Depending on the level of reactive silyl groups and on their construction, the principal products of these reactions are long-chain polymers having thermoplastic properties, fairly wide-mesh, three-dimensional networks having primarily elastomeric properties, or highly crosslinked systems having thermoset properties.

The polymers feature an organic scaffold, e.g. a polyurethane, polyester or polyether scaffold, or are based on a silicone scaffold. Common to all of the systems of interest here is that the polymers possess terminal silyl groups, which in turn carry either OH groups or groups which can be eliminated with water, e.g. alkoxy or acyloxy groups.

Polymers having silyl groups at the ends or in a side chain are described for example in EP 1 396 513 A1. The silyl groups with their eliminable substituents are introduced, according to the specification, by adding a hydrosilane onto terminal double bonds of the scaffold polymer, by reacting isocyanatosilanes with hydroxyl groups of the polymer, by reacting silanes containing active hydrogen atoms with isocyanate-functionalized polymers, or by reacting mercaptosilanes with terminal double bonds of the polymer. The polymers thus functionalized form the basis of compositions which are used as adhesives or sealants.

WO 2011/051385 A2 concerns a curable composition which comprises the following components:
a) at least one polyether and/or at least one polyacrylic ester having at least one end group -$A_n$-R—SiXYZ, in which A is a divalent linking group, R is a divalent hydrocarbon radical having 1-12 C atoms and optionally containing a heteroatom, and X, Y and Z independently of one another are $C_1$-$C_8$-alkyl, $C_1$-$C_8$-alkoxy or $C_1$-$C_8$-acyloxy radicals, with at least one of the radicals being a $C_1$-$C_8$-alkoxy or $C_1$-$C_8$-acyloxy group, and n is 0 or 1; and b) at least one organotin compound, c) at least one compound which is free from tin atoms and silicon atoms and which has at least two functions, each selected from carboxyl, carbonyl and hydroxyl groups, and also nitrogen atoms which are part of a ring system of aromatic character.

The composition is said to enable a longer working phase with a subsequently short time to through-cure.

A subject of WO 2009/130298 A1 is a process for preparing a silylated polyurethane, comprising:
(A) reacting
a. at least one polyol compound having a molecular weight of 4000-20,000 daltons with
b. a diisocyanate, with a stoichiometric excess of the diisocyanate compound over the OH groups of the polyol compounds, to form a polyurethane prepolymer which is isocyanate-terminated; and
(B) reacting the polyurethane prepolymer with one or more OH— terminated silanes of the formula

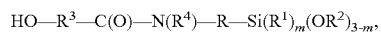

in which m is 0, 1 or 2, $R^1$ and $R^2$ are alkyl radicals having 1 to 4 carbon atoms, $R^3$ is a divalent organic radical having 1 to 10 atoms selected from C, N, S and/or O in the chain, $R^4$ is a hydrogen atom or an alkyl radical having 1 to 12 carbon atoms, and R is a difunctional organic group, to cap the isocyanate groups of the prepolymer with the above silane.

In the case of the polymer systems which crosslink via reactive silyl groups, a distinction may be made between one-component and two-component compositions. One-component systems generally have two or more hydrolysable silyl groups. The polymers thus functionalized result in general from the reaction of an OH-terminated polymer with a silane crosslinker having a plurality of groups which can be eliminated with water. This reaction takes place in the absence of moisture, in other words even on mere mixing or after the dispensing of the mixture into airtight cartridges, though it does require the presence of a condensation catalyst. When the now "endcapped" polymer is applied, water from the ambient air diffuses in and initiates the actual crosslinking reaction, which proceeds with hydrolysis of the hydrolysable silyl groups and subsequent condensation of the resultant Si—OH groups to form a network.

In the case of two-component systems, the Si—OH-terminated polymer is present as a first component, while the silane crosslinker is provided separately from it, together with a condensation catalyst, as a second component. As soon as the two components are combined, the polymers are crosslinked by condensation reactions mediated by the crosslinker. This crosslinking reaction does not require any moisture ingress.

Within the field being described here, particular attention is frequently focused on silicone-based polymers, which are distinguished in particular by their resistance to external influences such as temperature and precipitation. Consequently they are frequently also used for assembly applications in the construction sector. In this context, there is frequently a need for very thick adhesive layers or adhesive tapes, not least in order to achieve the high bond strengths required.

Among the silicone-based systems, a distinction is made between cold-crosslinking and hot-crosslinking silicone materials. The former are known as RTV silicone materials, with "RTV" standing for "room temperature vulcanization". The second materials stated are referred to as HTV silicone materials, with "HTV" standing for "high temperature vulcanization". RTV systems are often preferred, since their use does not entail the application of elevated temperatures and hence does not impose any such influences on the substrates to be bonded or sealed. A distinction is made between RTV1 systems and RTV2 systems, with RTV1 materials crosslinking in line with the above-described mechanism for one-component systems, and RTV2 materials in line with the mechanism for two-component systems.

A subject of WO 2012/119940 A1 is a room-temperature-crosslinking organopolysiloxane composition which has strength even in the non-crosslinked state and comprises the following constituents:
  a) an organopolysiloxane having a viscosity of at least 1000 mPas at 25° C. and at least two Si-bonded hydroxyl groups and/or Si-bonded hydrolysable groups;
  b) precipitated calcium carbonate as filler;
  c) a suitable catalyst;
  d) a crosslinker suitable for reacting with component a) with catalysis by c); and optionally
  e) one or more rheological modifiers;
  f) up to 10 wt % of one or more extenders or plasticizers;
where component b) is present in a fraction of 50 to 70 wt % of the overall composition.

WO 2014/086638 A1 describes a one- or two-component silicone formulation which comprises
  a) at least one crosslinkable diorganopolysiloxane;
  b) at least one oligomeric siloxane as crosslinker for the diorganopolysiloxane, the oligomeric siloxane being a condensation product of monomeric silane crosslinkers; and
  c) at least one functionalized oligodimethylsiloxane.
The composition is said to be suitable in particular as an elastic adhesive or sealant, especially in the fields of automotive, solar, facade construction, insulating glass, window glass, or generally for construction.

WO 2007/009871 A2 discloses a hotmelt coating/adhesive material comprising:
  A. a siloxane polymer composition comprising
    a) an organopolysiloxane, which may comprise at least two groups selected from
      i. Si-bonded alkenyl groups or
      ii. Si-bonded hydroxyl groups and/or hydrolysable groups;
    b) one or more fillers;
    and a crosslinking system comprising
    c) a suitable catalyst and optionally
    d) crosslinkers suitable for reaction with a) with catalysis by c); and also
  one or both of components B and C, wherein
  B. represents one or more hotmelt resins and
  C. represents one or more waxes having a melting temperature between 40 and 200° C. and/or an organic resin having a viscosity-average molecular weight of 200 to 6000 and a softening point of 0 to 150° C.;
where the total fraction of components B and/or C in the composition is from 2 to 60 wt %.

Common polymer-based compositions which cure via reactive silyl groups and have a profile of properties making them suitable for producing adhesive bonds between two substrates are paste-like mixtures and have very little or no dimensional stability. They are therefore not suitable for application as or in a layer body, especially not as an adhesive for an adhesive tape. A material without sufficient cohesion or dimensional stability would run off or be squeezed out. Moreover, there would be no possibility of removing a release liner without residue or, generally, of unwinding from a roll, for example, without residue.

On the other hand, there is a great interest in adhesives which cure with atmospheric moisture, which are easy and convenient to apply, and which after they have crosslinked exhibit high bond strengths. It is an object of the disclosure, therefore, to provide a material which can be cured with atmospheric moisture, which can be applied easily and with great positional precision and after curing is able to transmit high forces.

SUMMARY OF THE DISCLOSURE

According to an aspect of the disclosure, an autohesive polymer material is provided that includes: at least one polymer having at least two terminal silyl groups of the Formula (1) given by:

$$Si(R^1)_a(R^2)_b \qquad (1).$$

Each of the radicals $R^1$ comprises an alkyl, alkenyl or aryl group or a hydrogen atom. Each of the radicals $R^2$ comprises a group that can be eliminated with water, b is 1, 2 or 3, and a is 3−b. The polymer material further includes at least one condensation catalyst. Further, the polymer material is chemically precrosslinked and further crosslinkable with moisture. In addition, the polymer material is configured for use as a layer body that can be applied to a substrate. The polymer material of this kind can also be used for producing permanent bonds.

According to an aspect of the disclosure, an autohesive polymer material is provided that includes a polymer material derived from a composition that includes:
  (a) at least one polymer (Pol1) having at least two terminal silyl groups, each silyl group given by Formula (1):

$$Si(R^1)_a(R^2)_b \qquad (1),$$

wherein each of the radicals $R^1$ comprises an alkyl, alkenyl or aryl group or a hydrogen atom,
  wherein each of the radicals $R^2$ comprises a group that can be eliminated with water, and
  wherein b is 1, 2 or 3 and a is 3−b;
  (b) at least one polymer (Pol2) having at least two terminal, Si-bonded OH groups;
  (c) at least one organosilane and/or at least one organooligosiloxane, wherein each of the at least one organosilane and/or the at least one organooligosiloxane comprises at least three Si-bonded groups which can be eliminated with water; and
  (d) at least one condensation catalyst,
  wherein the polymer material is chemically precrosslinked and further crosslinkable with moisture, and
  further wherein the polymer material is configured for use as a layer body that can be applied to a substrate.

DETAILED DESCRIPTION OF THE PREFERRED EMBODIMENTS

Additional features and advantages will be set forth in the detailed description which follows and will be apparent to those skilled in the art from the description, or recognized by practicing the embodiments as described in the following description, together with the claims.

The achievement of the object is based on the concept of providing a material which crosslinks via reactive silyl groups and can be crosslinked gradually.

A first and general subject of the disclosure is an autohesive polymer material, chemically precrosslinked and further crosslinkable with moisture, for use as a layer body which can be applied to a substrate, which comprises at least one polymer having at least two terminal silyl groups of the Formula (1):

$$\mathrm{Si}(R^1)_a(R^2)_b \qquad (1),$$

in which the radicals $R^1$ independently of one another are an alkyl, alkenyl or aryl group or are a hydrogen atom, the radicals $R^2$ are a group which can be eliminated with water, and b is 1, 2 or 3 and a is 3−b.

A "layer body which can be applied to a substrate", as used herein, refers to a material which is shaped into a layer and which on application to a substrate substantially retains its shape and dimensions without substantial external influence. Furthermore, the layer body can preferably be wound onto itself, optionally with use of a release liner. The suitability of a polymer material of the disclosure for use in a layer body of this kind therefore presupposes that the material is sufficiently dimensionally stable to be applied, but also wound, stacked or otherwise packed or processed, without running or being squeezed out in the process. Moreover, although it is already precrosslinked, the material is further crosslinkable by moisture, for example atmospheric moisture, through hydrolysis of the silyl groups and subsequent condensation of the resulting Si—OH groups with other Si—OH or hydrolysable groups of two or more macromolecules.

A "polymer material", as used herein, refers to a composition which, to a significant proportion relevant in relation to its properties, comprises one or more polymers. In embodiments of the disclosure, the fraction of the entirety of all the polymers having at least two terminal silyl groups of the Formula (1) (these polymers also being referred to below as "$Pol_{sil}$") in the polymer material of the disclosure is preferably at least 15 wt %, more preferably at least 20 wt %, very preferably at least 25 wt %, and more particularly at least 30 wt %, for example, at least 35 wt %.

The term, "chemically precrosslinked", as used herein, means that, between at least some of the macromolecules originally used for producing the polymer material, there has already been a linking process, proceeding with formation of chemical bonds, that is manifested in increased cohesion relative to the macromolecules intended for producing the polymer material and present alongside one another with no crosslinking at all. This crosslinking, however, is not yet concluded, and consequently the polymer material is still further crosslinkable. The chemical precrosslinking may have been accomplished via an auxiliary intended for this purpose and/or via initial reaction of individual macromolecules with one another. Instead of "chemically precrosslinked" it is also possible to use the expression "chemically part-crosslinked".

Factors determined by the extent of crosslinking of the polymer material include the ratio of loss modulus (G") to storage modulus (G'), which is referred to as tan δ. The greater the extent to which a polymer material is crosslinked, the smaller this ratio becomes; at the point of maximum crosslinking, it reaches its minimum for the material in question, and the material hence reaches its greatest approximation to the properties of an elastic solid body.

The ratio of loss modulus (G") to storage modulus (G') (tan δ) of a polymer material of the disclosure is preferably at least twice, more preferably at least 2.5 times and more particularly at least 3 times the tan δ minimum achievable for this material under otherwise identical conditions. In other words, the material is therefore crosslinked only to a certain degree and is able by itself—i.e., in particular without further addition of crosslinkers—to crosslink further to the point of the tan δ minimum which is achievable for said material. This implies advantageously a relevant flow capacity on the part of the material, i.e., a significant fraction of viscous flow capacity, which means in turn that the material is able to a certain degree to flow onto a substrate and hence to wet it. The material therefore has a "tack" which ensures that in the merely precrosslinked or part-crosslinked state, the material, in terms of the extent of its properties, resembles a pressure-sensitive adhesive and correspondingly can also advantageously be employed as such.

As used herein, the term "further crosslinkable with moisture" means that the chemically precrosslinked polymer material is able to crosslink (further) with formation of chemical bonds on exposure to water, more particularly only on exposure to atmospheric moisture, and, as a result, there is a further build-up of cohesion within the material relative to the precrosslinked state.

As used herein, the term "autohesive" means that the polymer material has a perceptible inherent adhesiveness and so develops immediate attachment to surfaces of materials that are common in industry, under a certain applied pressure, hence exhibiting a technically relevant tack on such surfaces. The term "autohesive" is understood presently in contradistinction to a "pressure-sensitive adhesive" which exhibits its pressure-sensitive adhesiveness permanently, whereas the polymer material of the disclosure largely loses its inherent adhesiveness, which it has in the (only) precrosslinked state, as a result of the further crosslinking, albeit without losing the adhesion to the substrates it has developed before further crosslinking.

The polymer material of the disclosure may also be referred to as a self-supporting polymer material. It can be used, as described, as an intrinsically dimensionally stable layer body. In this sense, the material as such may form the layer body, but it may also function as a layer in a multilayer construction. The polymer material of the disclosure is preferably an autohesive polymer material, chemically precrosslinked and further crosslinkable with moisture, for use in an adhesive tape. The material is therefore in particular of sufficient dimensional stability not to run or to be squeezed out during customary uses or storage procedures of an adhesive tape, such as when applying the adhesive tape to a substrate to be bonded and when rolling or winding up the adhesive tape into a roll or reel. The adhesive tape with particular preference is a structural adhesive tape or an adhesive tape for producing structural bonds.

In accordance with the disclosure, the polymer material comprises at least one polymer having at least two terminal silyl groups of the Formula (1) (as described earlier). The radicals $R^2$ of the Formula (1) which can be eliminated with water are preferably selected from the group consisting of alkoxy, acyloxy, amino, eneoxy and ketoxime groups; more preferably they are selected from the group consisting of methoxy, ethoxy, methylethylketoxime and methylisobutylketoxime groups. The variable b of the Formula (1) is preferably 2 or 3, more particularly 3. The radicals $R^1$ of the Formula (1) are preferably selected from the group consisting of methyl, ethyl, phenyl and vinyl groups. The terminal silyl groups of the Formula (1) are preferably selected independently of one another from the group consisting of vinyldimethoxysilyl, vinyldiethoxysilyl, methyldimethoxysilyl, methyldiethoxysilyl, trimethoxysilyl, triethoxysilyl, methylbis(methylethyl-ketoxime)silyl, tris(methylethylketoxime)silyl, vinylbis(methylethylketoxime) silyl, vinylbis(methylisobutylketoxime)silyl, methylbis(methylisobutylketoxime)silyl and tris(methylisobutylketoxime)silyl groups. In addition, the scaffold of the polymer having at least two terminal silyl groups of the Formula (1) (Pol$_{sil}$) is preferably selected from the group consisting of polyethers, polyurethanes, polysiloxanes, polyureas, polyacrylates, polyolefins and polyesters and also copolymers of these.

With particular preference, the polymer Pol$_{sil}$ is an organopolysiloxane, more particularly an organopolysiloxane based on siloxane units of the Formula (2):

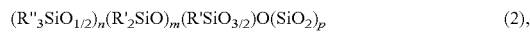

$$(R''_3SiO_{1/2})_n(R'_2SiO)_m(R'SiO_{3/2})O(SiO_2)_p \qquad (2),$$

in which the radicals R" independently of one another are an alkyl, alkenyl, aryl, alkoxy or ketoxime group or are a hydrogen atom; the radicals R' independently of one another are alkyl, aryl or alkenyl radicals; n≥2, m>0 and also o, p≥0; and at least two of the siloxane units (R"$_3$SiO$_{1/2}$) correspond to the above-described terminal silyl groups of the Formula (1). The Formula (2) is not a structural formula and therefore only conveys the composition of the organopolysiloxane made up of the siloxane units, but not the linking thereof with one another.

In one embodiment, the polymer material of the disclosure is obtainable by mixing a composition comprising:
at least one polymer Pol1,
    the ends of which independently of one another are each formed by a silyl group of the Formula (1),
at least one polymer Pol2,
    which has at least two terminal, Si-bonded OH groups;
at least one organosilane and/or at least one organooligosiloxane,
    in each case containing at least three Si-bonded groups which can be eliminated with water; and
at least one condensation catalyst.
The polymer Pol1 is preferably a diorganopolysiloxane of the Formula (3):

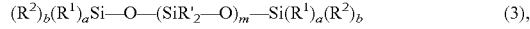

$$(R^2)_b(R^1)_aSi-O-(SiR'_2-O)_m-Si(R^1)_a(R^2)_b \qquad (3),$$

in which the radicals R' have the definition indicated for the Formula (2), m>0 and R$^1$, R$^2$, a and b have the definition according to the Formula (1). In principle, the radicals R' may be distributed in all conceivable and chemically possible constellations over the diorganopolysiloxane. Known examples include polydimethylsiloxanes, poly(methylphenyl)siloxanes and poly(dimethylsiloxane/diphenylsiloxane) copolymers.

The radicals R' in the Formula (3) independently of one another are preferably methyl, ethyl or phenyl radicals. More preferably the diorganopolysiloxane of the Formula (3) is a polydimethylsiloxane, a poly(methylphenyl)siloxane or a dimethylsiloxane-diphenylsiloxane copolymer, very preferably a polydimethylsiloxane. The Formula (3) is a structural formula, and so also conveys the linking of the siloxane units with one another.

The polymer Pol1 preferably has a number-average molecular weight Mn (by the measurement method described herein) of 40,000 to 150,000 g/mol, more preferably of 60,000 to 90,000 g/mol. The polymer Pol1 likewise preferably has a viscosity of 60 to 90 Pa·s, more preferably of 70 to 90 Pa·s (according to DIN 53019, plate/plate).

The polymer Pol2 is preferably a diorganopolysiloxane of the Formula (4):

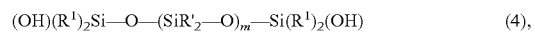

$$(OH)(R^1)_2Si-O-(SiR'_2-O)_m-Si(R^1)_2(OH) \qquad (4),$$

in which the radicals R' have the definition indicated for the Formula (2), m>0 and the radicals R$^1$ have the definition according to the Formula (1). In principle, the radicals R' may be distributed in all conceivable and chemically possible constellations over the diorganopolysiloxane. Known examples include polydimethylsiloxanes, poly(methylphenyl)siloxanes and poly(dimethylsiloxane/diphenylsiloxane) copolymers.

The radicals R' in the Formula (4) independently of one another are preferably methyl, ethyl or phenyl radicals. More preferably the diorganopolysiloxane of the Formula (4) is a polydimethylsiloxane, a poly(methylphenyl)siloxane or a dimethylsiloxane-diphenylsiloxane copolymer, very preferably a polydimethylsiloxane. The Formula (4) is a structural formula, and so also conveys the linking of the siloxane units with one another. The polymer Pol2 preferably has a weight-average molecular weight M$_w$ of 40,000 to 100,000 g/mol, more preferably of 55,000 to 85,000 g/mol. The polymer Pol2 likewise preferably has a viscosity of 5 to 40 Pa·s, more preferably of 10 to 30 Pa·s.

In principle, the polymers Pol1 and Pol2 may be constructed from the same monomers or from monomers different from one another. The polymer Pol2 is preferably constructed from the same monomers as the polymer Pol1, although the number of repeating units and hence the molecular weight may differ.

The polymer material of the disclosure can be obtained by mixing a composition that comprises at least one organosilane or organooligosiloxane having at least three Si-bonded groups which can be eliminated with water. Preference is given to using an organosilane, and more preferably this organosilane is selected from the group consisting of vinyltrimethoxysilane (VTMO), vinyltriethoxysilane (VTEO), methyltrimethoxysilane (MTMO), methyltriethoxysilane (MTEO), tetraethyl orthosilicate (TEOS), tetramethyl orthosilicate (TMOS), methyltris(methylethylketoxime)silane, tetra(methylethylketoxime)silane, vinyltris(methylethylketoxime)silane, methyltris(methylisobutylketoxime)silane, vinyltris(methylisobutylketoxime)silane and tetra(methylisobutylketoxime)silane.

In the composition to be mixed, the polymer Pol1 or the entirety of all the polymers Pol1 is preferably present at 10 to 50 wt %, more preferably at 20 to 40 wt %, based in each case on the total weight of the composition. The polymer Pol2 or the entirety of all the polymers Pol2 is present, in the composition to be mixed, preferably at 5 to 30 wt %, more preferably at 8 to 20 wt %, based in each case on the total weight of the composition. The weight ratio of the entirety of all the polymers Pol1 to the entirety of all the polymers Pol2 is preferably 5:1 to 10:1.

The organosilane or organooligosiloxane, or the entirety of all the organosilanes and organooligosiloxanes having in each case at least three Si-bonded groups which can be eliminated with water, in the composition to be mixed, is present preferably at 0.5 to 8 wt %, more preferably at 1 to 5 wt %, based in each case on the total weight of the composition. Further, the composition is mixed preferably in the absence of atmospheric moisture.

The polymer material of the disclosure and the composition to be mixed each comprise at least one condensation catalyst. The condensation catalyst is preferably selected from the group consisting of compounds of tin, of titanium, of zinc, of zirconium, of phosphorus and of bismuth, and more particularly selected from the group consisting of organotin, organotitanium, organozinc, organozirconium, organophosphorus and organobismuth compounds. The entirety of all the condensation catalysts is present in the polymer material of the disclosure or in the composition to be mixed preferably at 0.05 to 5 wt %, more preferably at 0.08 to 1 wt %, based in each case on the total weight of the composition.

The polymer material of the disclosure and also the composition to be mixed preferably comprise at least one filler. With particular preference the filler is selected from the group consisting of $CaCO_3$, fumed silica, precipitated silica, $Al(OH)_3$ and BN. In principle, all of the fillers listed may have surface hydrophobization, in particular with fatty acids, e.g. stearic acid. The entirety of all the fillers is present in the polymer material of the disclosure or in the composition to be mixed preferably at 20 to 80 wt %, more preferably at 30 to 60 wt %, based in each case on the total weight of the composition.

In one embodiment the polymer material of the disclosure comprises at least one chalk. The chalk may be functionalized or unfunctionalized, and there may be one or more chalks present. Chalk is preferably present in the polymer material of the disclosure at in total a maximum of 60 wt %, more particularly 20 to 55 wt %, based on the total weight of the polymer material.

The polymer material of the disclosure and also the composition to be mixed may comprise one or more adhesion promoters. Where included, the adhesion promoter is preferably selected from aminopropyltrialkoxysilanes and glycidyloxypropyltrialkoxysilanes; more preferably it is selected from am inopropyltriethoxysilane (AMEO) and glycidyloxypropyltriethoxysilane (GLYEO). The entirety of all the adhesion promoters is present in the polymer material of the disclosure or in the composition to be mixed preferably at 0.1 to 2 wt %, more preferably at 0.5 to 1.5 wt %, based in each case on the total weight of the composition.

The polymer material of the disclosure may comprise one or more plasticizers. Where included, the plasticizer is preferably a trimethylsilyl-terminated polydiorganosiloxane (PDMS) or a mixture of trimethylsilyl-terminated polydiorganosiloxanes having different chain lengths; more preferably it is a trimethylsilyl-terminated PDMS or a mixture of trimethylsilyl-terminated PDMS having different chain lengths.

A further subject of the disclosure is the use of a polymer material of the disclosure for producing permanent bonds, preferably structural bonds, more particularly for joining components in electronic devices, in construction applications, in aircraft construction and/or in automotive construction. With particular preference the polymer material of the disclosure is used for producing bonds, especially structural bonds, in glazing systems, particularly in the context of structural glazing processes.

A further subject of the disclosure is the use of a polymer material of the disclosure for producing an adhesive tape, preferably for producing an adhesive tape for forming structural bonds.

Gel Permeation Chromatography (GPC):

Unless otherwise noted, GPC is used to determine the number-average and weight-average molecular weights ($M_n$ and $M_w$) of the organopolysiloxanes and silicone resins of the disclosure. The settings used for the determination were as follows: a toluene eluent; a measuring temperature of 23° C.; Polymer Standards Service Gmbh (PSS) SDV precolumn, 5 µm, $10^2$ Å (10 nm), ID 8.0 mm×50 mm; a separation; PSS SDV column, 5 µm, $10^2$ Å (10 nm), and also $10^3$ Å (100 nm), and $10^6$ Å ($10^5$ nm), each with ID 8.0 mm×300 mm; a sample concentration 3 g/l, flow rate 1.0 ml per minute; and a polydimethylsiloxane standard (14-point calibration in the $M_{peak}$ range from 400 to 2,300,000 g/mol).

EXAMPLES

The intention of the examples below is to describe the disclosure in more detail, without thereby wishing to limit the disclosure. The production of a dimensionally stable, reactive silicone adhesive employed in the following examples, and according to the principles of the disclosure, is detailed in the following paragraphs.

The components listed in Table 1, in the proportions specified therein, were mixed in a stirrer in the absence of atmospheric moisture. For this purpose, first the polymer and the pigment paste were introduced. The mixture was slowly heated to 45-55° C. and the mixing chamber was evacuated. Then, under inert gas, methyltri(methylethylketoxime)silane, tetraethyl orthosilicate and aminopropyltriethoxysilane were added and incorporated by mixing. Subsequently, under inert gas, vinyltri(methylethylketoxime) silane was added. In the next step, the chalks were added in portions under inert gas. In the last step, dibutyltin dilaurate was incorporated by mixing under inert gas, and the mixture was dispensed into cartridges in the absence of air.

TABLE 1

| Composition of the mixture for producing the silicone adhesive, M1 | |
|---|---|
| Bilaterally hydroxy-terminated polydimethylsiloxane (PDMS) ($M_w$ = 100,000 g/mol, η = 80 Pa · s) | 31.62% |
| Methyltri(methylethylketoxime)silane | 2.91% |
| Tetraethyl orthosilicate | 0.45% |
| Vinyltri(methylethylketoxime)silane | 1.04% |
| Aminopropyltriethoxysilane | 1.29% |
| Pigment (carbon black in dispersion in PDMS oil, Wacker ELASTOSIL colour paste 9005 black) | 5.25% |
| Untreated chalk | 44.67% |
| Chalk treated with fatty acid | 12.76% |
| Dibutyltin dilaurate | 0.01% |

The mixture thus prepared (referred to in the following examples as "M1") according to Table 1 was mixed, with the further exclusion of atmospheric moisture, with a bilaterally hydroxy-terminated PDMS ($M_w$=70,000 g/mol, η=20 Pa·s) in an M1:PDMS weight ratio of 7.5:1, and after 6 hours the mixture was shaped into a web having a layer thickness as reported for each of the measurements below (referred to in the following examples as a "layer body"). The material for shaping to the web that results from the here-described blending of the material M1 with the further PDMS is referred to in the following examples as "M2".

Example 1—Dimensional Stability

According to this example, the material M2 produced as described above was shaped on a high density polyethylene (HDPE) film with a 120 µm thickness in two 10×20 cm frames into two layer bodies (designated "Ex. 1"), each with a thickness of 1 mm. The frames were removed and the layer bodies were lined with a further HDPE film with a thickness of 120 µm. The resulting assembly was welded, in each case together with a silica desiccant, into a moisture-tight composite aluminium/PE pouch, with airtight welding, and stored at room temperature.

After two days, the first layer body was taken from the composite aluminium/PE pouch, and the second layer body after 7 days. The HDPE films were removable without residue from both layer bodies, Ex. 1.

Comparative Example 1—Dimensional Stability

As a comparison to the Ex. 1 layer bodies, two layer bodies 1 mm thick (designated "Comp. Ex. 1") were produced from the mixture M1 in manner consistent with Example 1, but without the addition of a hydroxy-terminated PDMS. The layer bodies, Comp. Ex. 1, were welded together with the desiccant into a moisture-tight composite aluminium/PE pouch, with airtight welding.

After two days, the first layer body was taken from the composite aluminium/PE pouch, and the second layer body after 7 days. On removal of the film, both layer bodies, Comp. Ex. 1, were split within themselves (cohesively).

T-Block Test of the Ex. 1 and Comp. Ex. 1 Layer Bodies

From the material M2, as described in Example 1, a layer body (Ex. 1) with two outer HDPE films was produced, and was welded together with a desiccant into a moisture-tight composite aluminium/PE pouch, with airtight welding. After 2 days, the layer body was taken from the composite aluminium/PE pouch. After the removal of the films, the layer body was subjected to the following test.

Two T-shaped aluminium profiles (25×25×2 mm, 25 mm) were cleaned with acetone, after which the solvent was allowed to evaporate for 10 minutes. The layer body was trimmed into square sections with an edge length of 25 mm. The aluminium profiles were subsequently each bonded with a layer body and pressed by hand for 15 seconds. The test specimen thus produced was then equilibrated at 23° C. and 50% relative humidity for the time reported in Table 2. The test specimen was subsequently clamped into a tensile testing machine from ZWICK, and then the two T-blocks were pulled apart with a velocity of 50 mm/min. The maximum force required to achieve this was measured, with the result being reported in Table 2 as the mean value from two individual measurements, in kPa.

TABLE 2

Results of the T-block test of the Ex. 1 layer body

| Storage time under standard conditions | Maximum force [kPa] |
|---|---|
| 1 week | 522 |
| 2 weeks | 765 |
| 4 weeks | 880 |

The increasing force needed with longer storage in order to separate the T-profiles indicates a progressive increase in the cohesion of the material under the influence of moisture, and hence the reactivity of the dimensionally stable silicone adhesive of the disclosure.

In contrast, the M1 material (Comp. Ex. 1) could not be introduced into this test at all as a layer body used for the bonding of the T-profiles, as it lacked dimensional stability and it ran between the profiles. The test could therefore not be meaningfully conducted for the M1 material, Comp. Ex. 1.

Example 2—Rheological Parameter Measurements

Similar to Example 1, two layer bodies each with a thickness of 2 mm (Ex. 2) were shaped between two 50 μm polyethylene terephthalate (PET) films from the material M2. One of these layer bodies was welded together with a silica desiccant into a moisture-tight composite aluminium/PE pouch, in which it was stored at room temperature for two days. The second layer body was stored under standard conditions for four weeks for complete curing. The samples from this example were then measured to determine their rheological parameters.

Comparative Example 2—Rheological Parameter Measurements

As a comparative example, the rheological parameters of the material M1 were determined. Similar to the layer bodies of the Comparative Example 1, two layer bodies each with a thickness of 2 mm (Comp. Ex. 2) were shaped from this material as well between two PET films and were packaged or stored, respectively, as described above.

Rheological Measurement Method for the Ex. 2 and Comp. Ex. 2 Layer Bodies

The rheological parameters of the materials under investigation were determined on a RPA2000 Rubber Process Analyzer from Alpha. The measurements were conducted for 10 minutes at 30° C. with a frequency of 10 rad/s and a deflection of 4%. The results of these measurements are presented below in in Table 3.

TABLE 3

Results of the rheological investigations of Ex. 2 and Comp. Ex. 2

| Parameter | Conditions | M2 (Ex. 2) | M1 (Comp. Ex. 2) |
|---|---|---|---|
| Complex viscosity [Pa · s] | Welded in for 2 days | 1680 | 700 |
| | After 4 weeks of standard conditions | 36,320 | 42,650 |
| Loss factor (tanD) | Welded in for 2 days | 0.77 | 1.42 |
| | After 4 weeks of standard conditions | 0.19 | 0.24 |

The rheological parameters of these examples, as listed in Table 3, show that the viscosity of the silicone adhesive of the disclosure (Ex. 2) rises when stored under the influence of air. The loss factor is <1 and falls further under the influence of atmospheric moisture. The material of the disclosure (Ex. 2) is therefore more like an elastic body than a liquid in its behaviour.

The viscosity of the material M1 (Comp. Ex. 2) from the comparative example likewise rises further when stored under the influence of air. The loss factor in the absence of atmospheric moisture is well above 1 and falls below 1 only after exposure to moisture. The material M1 in its behaviour therefore is more like a liquid than an elastic body in the absence of atmospheric moisture and initially after such storage.

According to a first aspect of the disclosure, an autohesive polymer material is provided that includes: at least one polymer having at least two terminal silyl groups of the Formula (1) given by:

$$Si(R^1)_a(R^2)_b \tag{1}.$$

Each of the radicals $R^1$ comprises an alkyl, alkenyl or aryl group or a hydrogen atom. Each of the radicals $R^2$ comprises a group that can be eliminated with water, b is 1, 2 or 3, and a is 3−b. The polymer material further includes at least one condensation catalyst. Further, the polymer material is chemically precrosslinked and further crosslinkable with moisture. In addition, the polymer material is configured for use as a layer body that can be applied to a substrate.

According to a second aspect, the first aspect is provided, wherein each of the radicals $R^2$ of the Formula (1) is selected from the group consisting of alkoxy, acyloxy, amino, eneoxy and ketoxime groups.

According to a third aspect, the first aspect is provided, wherein each of the radicals $R^2$ of the Formula (1) is selected from the group consisting of methoxy, ethoxy, methylethylketoximine and methylisobutylketoximine groups.

According to a fourth aspect, the third aspect is provided, wherein each of the radicals $R^1$ of the Formula (1) is selected from the group consisting of methyl, ethyl, phenyl and vinyl groups.

According to a fifth aspect, the fourth aspect is provided, wherein each of the at least two terminal silyl groups are selected from the group consisting of vinyldimethoxysilyl, vinyldiethoxysilyl, methyldimethoxysilyl, methyldiethoxysilyl, trimethoxysilyl, triethoxysilyl, methylbis(methylethylketoxime)silyl, tris(methylethylketoxime)silyl, vinylbis(methylethylketoxime)silyl, vinylbis(methylisobutylketoxime)silyl, methylbis(methylisobutylketoxime)silyl and tris(methylisobutylketoxime)silyl groups.

According to a sixth aspect, the first aspect is provided, wherein the at least one polymer having at least two terminal silyl groups of the Formula (1) is at least 30 wt % of the polymer material.

According to a seventh aspect, the first aspect is provided, wherein the at least one polymer having at least two terminal silyl groups of the Formula (1) is selected from the group consisting of polyethers, polyurethanes, polysiloxanes, polyureas, polyacrylates, polyolefins, polyesters and copolymers thereof.

According to an eighth aspect, the seventh aspect is provided, wherein the at least one polymer having at least two terminal silyl groups of the Formula (1) is an organopolysiloxane based on siloxane units given by Formula (2):

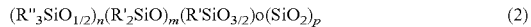
$$(R''_3SiO_{1/2})_n(R'_2SiO)_m(R'SiO_{3/2})o(SiO_2)_p \qquad (2)$$

Each of the radicals R" comprises an alkyl, alkenyl, aryl, alkoxy or ketoxime group or a hydrogen atom. Each of the radicals R' comprises alkyl, aryl or alkenyl radicals. Further, n≥2, m>0, and o, p≥0, and at least two of the siloxane units $(R''_3SiO_{1/2})$ correspond to the at least two terminal silyl groups given by Formula (1).

According to a ninth aspect, the first aspect is provided, wherein the condensation catalyst is selected from the group consisting of compounds of tin, of titanium, of zinc, of zirconium, of phosphorus and of bismuth.

According to a tenth aspect, an autohesive polymer material is provided. The autohesive polymer material comprises a polymer material derived from a composition comprising at least one polymer (Pol1) having at least two terminal silyl groups, each silyl group given by Formula (1):

$$Si(R^1)_a(R^2)_b \qquad (1).$$

Each of the radicals $R^1$ comprises an alkyl, alkenyl or aryl group or a hydrogen atom. Each of the radicals $R^2$ comprises a group that can be eliminated with water. Further, b is 1, 2 or 3 and a is 3–b. The autohesive polymer material also comprises at least one polymer (Pol2) having at least two terminal, Si-bonded OH groups. Additionally, the autohesive polymer material comprises at least one organosilane and/or at least one organooligosiloxane. Each of the at least one organosilane and/or the at least one organooligosiloxane comprises at least three Si-bonded groups which can be eliminated with water. Further, the autohesive polymer material comprises at least one condensation catalyst. The polymer material is chemically precrosslinked and further crosslinkable with moisture. Further, the polymer material is configured for use as a layer body that can be applied to a substrate.

According to an eleventh aspect, the tenth aspect is provided, wherein the at least one polymer (Pol1) is a diorganopolysiloxane given by Formula (3):

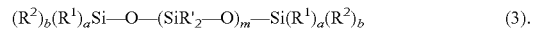
$$(R^2)_b(R^1)_aSi-O-(SiR'_2-O)_m-Si(R^1)_a(R^2)_b \qquad (3).$$

Each of the radicals R' comprises alkyl, aryl or alkenyl radicals. Each of the radicals $R^1$ comprises an alkyl, alkenyl or aryl group or a hydrogen atom. Each of the radicals $R^2$ comprises a group that can be eliminated with water. Further, m>0, b is 1, 2 or 3 and a is 3–b.

According to a twelfth aspect, the eleventh aspect is provided, wherein each of the radicals R' is a methyl radical, an ethyl radical or a phenyl radical.

According to a thirteenth aspect, the eleventh aspect is provided, wherein the diorganopolysiloxane given by Formula (3) is a polydimethylsiloxane, a poly(methylphenyl)siloxane or a dimethylsiloxane-diphenylsiloxane copolymer.

According to a fourteenth aspect, the tenth aspect is provided, wherein the at least one polymer (Pol1) comprises a number-average molecular weight $M_n$ of 40,000 to 150,000 g/mol and a viscosity of 60 to 90 Pa·s.

According to a fifteenth aspect, the tenth aspect is provided, wherein the at least one polymer (Pol1) is present at 10 to 50 wt % of the composition, based on a total weight of the composition.

According to a sixteenth aspect, the tenth aspect is provided, wherein the at least one polymer (Pol2) comprises a weight-average molecular weight Mw of 40,000 to 100,000 g/mol and a viscosity of 5 to 40 Pa·s.

According to a seventeenth aspect, the tenth aspect is provided, wherein the at least one polymer (Pol2) is present at 5 to 30 wt % of the composition, based on a total weight of the composition.

According to an eighteenth aspect, the tenth aspect is provided, wherein a weight ratio of the at least one polymer (Pol1) and the at least one polymer (Pol2) is from 5:1 to 10:1.

According to a nineteenth aspect, the tenth aspect is provided, wherein the at least one organosilane and/or the at least one organooligosiloxane is present at 0.5 to 8 wt % of the composition, based on a total weight of the composition.

According to a twentieth aspect, the tenth aspect is provided, wherein the condensation catalyst is selected from the group consisting of compounds of tin, of titanium, of zinc, of zirconium, of phosphorus and of bismuth.

According to a twenty-first aspect, an autohesive polymer material is provided. The autohesive polymer material is chemically precrosslinked and further crosslinkable with moisture, for use as a layer body which can be applied to a substrate. The polymer material comprises at least one polymer having at least two terminal silyl groups of the Formula (1):

$$Si(R^1)_a(R^2)_b \qquad (1),$$

in which the radicals $R^1$ independently of one another are an alkyl, alkenyl or aryl group or are a hydrogen atom, the radicals $R^2$ are a group which can be eliminated with water, and b is 1, 2 or 3 and a is 3–b; and at least one condensation catalyst.

According to a twenty-second aspect, the twenty-first aspect is provided, wherein the radicals $R^2$ of the Formula (1) are selected from the group consisting of alkoxy, acyloxy, amino, eneoxy and ketoxime groups.

According to a twenty-third aspect, the twenty-first or the twenty-second aspect is provided, wherein the polymer material is obtainable by mixing a composition comprising: at least one polymer Pol1, the ends of which independently of one another are each formed by a silyl group of the Formula (1); at least one polymer Pol2, which has at least two terminal, Si-bonded OH groups; at least one organosilane and/or at least one organooligosiloxane, in each case containing at least three Si-bonded groups which can be eliminated with water; and at least one condensation catalyst.

According to a twenty-fourth aspect, the twenty-third aspect is provided, wherein the entirety of all the polymers Pol1 in the composition amounts to 10 to 50 wt %, based on the total weight of the composition.

According to a twenty-fifth aspect, the twenty-third or the twenty-fourth aspect is provided, wherein the entirety of all the polymers Pol2 in the composition amounts to 5 to 30 wt %, based on the total weight of the composition.

According to a twenty-sixth aspect, any one of the twenty-first through the twenty-fifth aspect is provided, wherein the condensation catalyst is selected from the group consisting of compounds of tin, of titanium, of zinc, of zirconium, of phosphorus and of bismuth.

According to a twenty-seventh aspect, any one of the twenty-first through the twenty-sixth aspect is provided, wherein the polymer material is used for producing permanent bonds.

While exemplary embodiments and examples have been set forth for illustrative purposes, the foregoing description is not intended in any way to limit the scope of the disclosure and the appended claims. Accordingly, variations can be made to the embodiments and examples above without departing from the principles of the disclosure.

What is claimed is:

1. An autohesive polymer material, comprising: a polymer material derived from a composition comprising
at least one polymer having at least two terminal silyl groups, each silyl group given by Formula (1):

$$Si(R^1)_a(R^2)_b \qquad (1),$$

wherein each of the radicals $R^1$ comprises an alkyl, alkenyl or aryl group or a hydrogen atom,
wherein each of the radicals $R^2$ comprises a group that can be eliminated with water, and
wherein b is 1, 2 or 3 and a is 3−b; and
at least one condensation catalyst,
wherein the condensation catalyst is selected from the group consisting of compounds of tin, titanium, zinc, zirconium, phosphorus, and bismuth,
wherein the polymer material is chemically precrosslinked and further crosslinkable with moisture, and
further wherein the polymer material is configured for use as a layer body that can be applied to a substrate.

2. The polymer material according to claim 1,
wherein each of the radicals $R^2$ of the Formula (1) is selected from the group consisting of alkoxy, acyloxy, amino, eneoxy and ketoxime groups.

3. The polymer material according to claim 1,
wherein each of the radicals $R^2$ of the Formula (1) is selected from the group consisting of methoxy, ethoxy, methylethylketoximine and methylisobutylketoximine groups.

4. The polymer material according to claim 3, wherein each of the radicals $R^1$ of the Formula (1) is selected from the group consisting of methyl, ethyl, phenyl and vinyl groups.

5. The polymer material according to claim 4, wherein each of the at least two terminal silyl groups are selected from the group consisting of vinyldimethoxysilyl, vinyldiethoxysilyl, methyldimethoxysilyl, methyldiethoxysilyl, trimethoxysilyl, triethoxysilyl, methylbis(methylethylketoxime)silyl, tris(methylethylketoxime)silyl, vinylbis(methylethylketoxime)silyl, vinylbis(methylisobutylketoxime)silyl, methylbis(methylisobutylketoxime)silyl and tris(methylisobutylketoxime)silyl groups.

6. The polymer material according to claim 1,
wherein the at least one polymer having at least two terminal silyl groups of the Formula (1) is at least 30 wt % of the polymer material.

7. The polymer material according to claim 1,
wherein the at least one polymer having at least two terminal silyl groups of the Formula (1) is selected from the group consisting of polyethers, polyurethanes, polysiloxanes, polyureas, polyacrylates, polyolefins, polyesters and copolymers thereof.

8. The polymer material according to claim 7, wherein the at least one polymer having at least two terminal silyl groups of the Formula (1) is an organopolysiloxane based on siloxane units given by Formula (2):

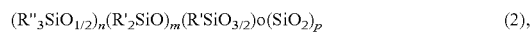

$$(R''_3SiO_{1/2})_n(R'_2SiO)_m(R'SiO_{3/2})_o(SiO_2)_p \qquad (2),$$

wherein each of the radicals R'' comprises an alkyl, alkenyl, aryl, alkoxy or ketoxime group or a hydrogen atom,
wherein each of the radicals R' comprises alkyl, aryl or alkenyl radicals,
wherein n≥2, m>0, and o, p≥0, and
further wherein at least two of the siloxane units $(R''_3SiO_{1/2})$ correspond to the at least two terminal silyl groups given by Formula (1).

9. An autohesive polymer material, comprising:
a polymer material derived from a composition comprising:
(a) at least one polymer (Pol1) having at least two terminal silyl groups, each silyl group given by Formula (1):

$$Si(R^1)_a(R^2)_b \qquad (1),$$

wherein each of the radicals $R^1$ comprises an alkyl, alkenyl or aryl group or a hydrogen atom,
wherein each of the radicals $R^2$ comprises a group that can be eliminated with water, and
wherein b is 1, 2 or 3 and a is 3−b;
(b) at least one polymer (Pol2) having at least two terminal, Si-bonded OH groups;
(c) at least one organosilane and/or at least one organooligosiloxane,
wherein each of the at least one organosilane and/or the at least one organooligosiloxane comprises at least three Si-bonded groups which can be eliminated with water; and
(d) at least one condensation catalyst,
wherein the condensation catalyst is selected from the group consisting of compounds of tin, titanium, zinc, zirconium, phosphorus, and bismuth,
wherein the polymer material is chemically precrosslinked and further crosslinkable with moisture, and
further wherein the polymer material is configured for use as a layer body that can be applied to a substrate.

10. The polymer material according to claim 9, wherein the at least one polymer (Pol1) is a diorganopolysiloxane given by Formula (3):

$$(R^2)_b(R^1)_a Si-O-(SiR'_2-O)_m-Si(R^1)_a(R^2)_b \qquad (3),$$

wherein each of the radicals R' comprises alkyl, aryl or alkenyl radicals, wherein each of the radicals $R^1$ comprises an alkyl, alkenyl or aryl group or a hydrogen atom, wherein each of the radicals $R^2$ comprises a group that can be eliminated with water, and further wherein m>0, b is 1, 2 or 3 and a is 3−b.

11. The polymer material according to claim 10, wherein each of the radicals R' is a methyl radical, an ethyl radical or a phenyl radical.

12. The polymer material according to claim 10, wherein the diorganopolysiloxane given by Formula (3) is a polydimethylsiloxane, a poly(methylphenyl)siloxane or a dimethylsiloxane-diphenylsiloxane copolymer.

13. The polymer material according to claim 9, wherein the at least one polymer (Pol1) comprises a number-average molecular weight $M_n$ of 40,000 to 150,000 g/mol and a viscosity of 60 to 90 Pa·s.

14. The polymer material according to claim 9, wherein the at least one polymer (Pol1) is present at 10 to 50 wt % of the composition, based on a total weight of the composition.

15. The polymer material according to claim 9, wherein the at least one polymer (Pol2) comprises a weight-average molecular weight Mw of 40,000 to 100,000 g/mol and a viscosity of 5 to 40 Pa·s.

16. The polymer material according to claim 9, wherein the at least one polymer (Pol2) is present at 5 to 30 wt % of the composition, based on a total weight of the composition.

17. The polymer material according to claim 9, wherein a weight ratio of the at least one polymer (Pol1) and the at least one polymer (Pol2) is from 5:1 to 10:1.

18. The polymer material according to claim 9, wherein the at least one organosilane and/or the at least one organooligosiloxane is present at 0.5 to 8 wt % of the composition, based on a total weight of the composition.

19. The polymer material according to claim 1, wherein the chemically precrosslinked polymer material exhibits a ratio (tan δ) of loss modulus (G") to storage modulus (G') of at least two times a minimum achievable tan δ of the polymer material.

20. The polymer material according to claim 9, wherein the chemically precrosslinked polymer material exhibits a ratio (tan δ) of loss modulus (G") to storage modulus (G') of at least two times a minimum achievable tan δ of the polymer material.

* * * * *